(No Model.)

G. JOHNSTON.
TRIAL CASE FOR OPTICAL LENSES.

No. 368,720. Patented Aug. 23, 1887.

WITNESSES
Samuel E. Thomas.
M. B. O'Dogherty.

INVENTOR
George Johnston
By W. W. Leggett
Attorney

UNITED STATES PATENT OFFICE.

GEORGE JOHNSTON, OF DETROIT, MICHIGAN.

TRIAL-CASE FOR OPTICAL LENSES.

SPECIFICATION forming part of Letters Patent No. 368,720, dated August 23, 1887.

Application filed March 2, 1887. Serial No. 229,442. (No model.)

*To all whom it may concern:*

Be it known that I, GEORGE JOHNSTON, of Detroit, county of Wayne, State of Michigan, have invented a new and useful Improvement in Trial-Cases for Optical Lenses; and I declare the following to be a full, clear, and exact description of the same, such as will enable others skilled in the art to which it pertains to make and use it, reference being had to the accompanying drawings, which form a part of this specification.

My invention has for its object a novel construction of trial-cases for optical lenses; and it consists of the combination of devices and appliances hereinafter specified, and more particularly pointed out in the claims.

Figure 1:
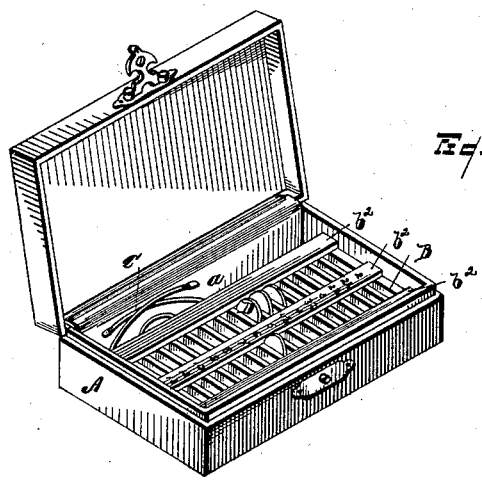
Figure 2:
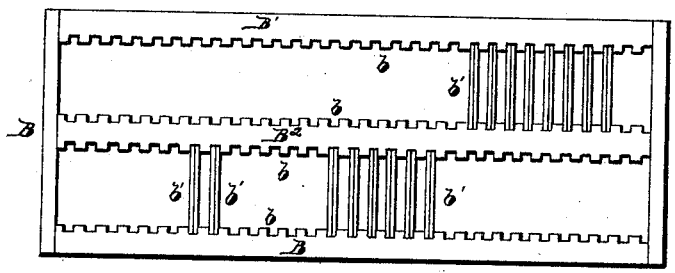
Figure 3:
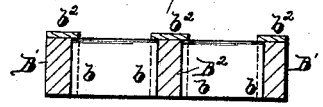
Figure 4:
Figure 5:
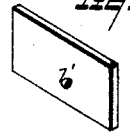

In the drawings, Figure 1 represents a case inclosing a lens-tray illustrating my invention. Fig. 2 is an inverted view of the lens-tray. Fig. 3 is a vertical cross-section of said tray. Fig. 4 is a separate view of one of the partitions. Fig. 5 is a modification of said partition.

I carry out my invention as follows: A represents the case or box inclosing a lens-tray, B, therein, and leaving a recess, $a$, to receive a pair of trial spectacle-frames, C, therein. The lens-tray is constructed of a suitable frame, B', provided, preferably, with one or more separate walls, B², said walls and the inner surfaces of the sides of the frame being also constructed with a series of kerfs, $b$, to receive a series of partitions, $b'$, the upper face of the tray-frame being provided with suitable coverings, $b^2$, to hide the timber of the frame and also permit a flange projecting over said kerfs, as shown in Fig. 3, and prevent the projection and removal of said partitions at the top of the frame of the tray, and thereby present a neat finish, the kerfs being open for the engagement and disengagement of said partitions upon its under side, as shown in Figs. 2 and 3, the under side of the tray of course fitting the base of the box or case. These partitions are located at suitable intervals from each other to receive different varieties of lenses, D, to be located in the space between said partitions. Said partitions I prefer to construct of a flexible fabric—as, for instance, of paper-board covered with a suitable fabric, as, for instance, a plush fabric, to present a neat finish—the partition thus constructed being doubled intermediate of its sides, as shown in Fig. 4, whereby the plush or ornamental finish covers the upper edge of the partition. The material of which these partitions are constructed—as, for instance, the paper and the plush—may be applied, the one to the other, in large sheets, the sheets being subsequently cut into separate pieces of a size sufficient to form a single partition when doubled or folded together, as shown in Fig. 4 and already described, thus facilitating the construction of said partitions very materially. The covering $b^2$ may also be constructed of a similar fabric, as of paper-board provided with a plush covering, which may be cut from the sheet in a manner analogous to the construction of the partitions, and then cemented or otherwise engaged upon the frame of the tray. The partition made thus of a folded sheet of paper covered with an ornamental fabric is elastic, thereby facilitating the engagement of lenses of various sizes in the spaces between the said partitions, and also affording a yielding surface adjacent to said lenses. In cheaper constructions of the tray, however, a single thickness of fabric, as of paper-board, may be employed for the partitions, as shown in Fig. 5, and which may be void of the ornamental covering.

What I claim is—

1. A trial-case for optical lenses provided with a lens-tray, said tray constructed with a series of kerfs having in combination therewith a series of partitions located in said kerfs, and covering $b^2$, located upon the upper surface of the tray-frame and projecting over the ends of said partitions, to prevent the removal of the partitions except from the under side of the tray, said partitions constructed of a flexible fabric, substantially as described.

2. A lens-tray constructed of a frame provided with a series of kerfs, having in combination therewith a series of partitions located in said kerfs, and covering $b^2$ on the upper edge of said frame and projecting over the ends of said partitions, to prevent the removal of the partitions except from the under side of the tray, said partitions constructed of a flexible fabric, substantially as described.

3. A lens-tray constructed of a frame provided with a series of kerfs having in combination a series of partitions, and a covering, $b^2$, engaged upon the upper edge of the frame and projecting over the ends of said partitions, to prevent the removal of the partitions except from the under side of the tray, said partitions constructed of a folded fabric provided with an ornamental covering, said fabric extended over the folded edges of said partitions, substantially as described.

In testimony whereof I sign this specification in the presence of two witnesses.

GEORGE JOHNSTON.

Witnesses:
N. S. WRIGHT,
M. B. O'DOGHERTY.